Nov. 11, 1924.

A. BARR ET AL 1,514,948

STEREOSCOPIC RANGE FINDER

Filed Aug. 16, 1921        2 Sheets-Sheet 1

Inventors:
Archibald Barr
William Stroud
By J. Walter Fowler
atty.

Nov. 11, 1924.
A. BARR ET AL
1,514,948
STEREOSCOPIC RANGE FINDER
Filed Aug. 16, 1921   2 Sheets-Sheet 2
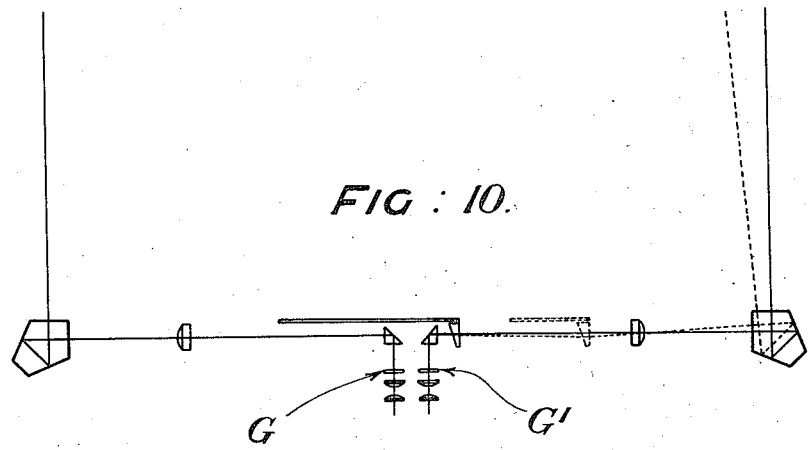
FIG : 10.
Inventors:-
Archibald Barr and William Stroud,
By:- J. Walter Fowler,
Attorney.

Patented Nov. 11, 1924.

1,514,948

UNITED STATES PATENT OFFICE.

ARCHIBALD BARR AND WILLIAM STROUD, OF GLASGOW, SCOTLAND, ASSIGNORS TO BARR AND STROUD, LIMITED, OF GLASGOW, SCOTLAND.

STEREOSCOPIC RANGE FINDER.

Application filed August 16, 1921. Serial No. 492,868.

(GRANTED UNDER THE PROVISIONS OF THE ACT OF MARCH 3, 1921, 41 STAT. L., 1313.)

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Stereoscopic Range Finders (for which we obtained patent in Great Britain, Number 165,461, dated October 12, 1918), of which the following is a specification.

Our invention consists in an improvement in stereoscopic rangefinders in which there has hitherto been a single reference mark in each field, the range measuring mechanism consisting of some suitable optical appliance for shifting one of the images so that it appears stereoscopically at the same apparent range as that of the reference mark, or mechanical appliance for shifting the reference mark in one of the fields relative to the reference mark in the other.

In the use of stereoscopic rangefinders as hitherto made it is necessary that the instrument should be held both in altitude and azimuth so that the image of the target shall be in close proximity to the reference mark. The object of our present improvement is to remove this restriction so as to enable the observer to get an observation of range when the target is in any place or any one of a number of places in the field. This we accomplish by replacing the single reference mark in each field of view by a series of marks or lines, the essential condition being that the two sets of marks or lines shall correspond in all respects and be contained in the focal plane of each field of view, so that they may all appear to be at the same distance (perspective depth) when viewed stereoscopically. They may consist e. g., of a series of isolated marks distributed over the field, or again, they may consist of lines forming a grating, the lines of which may be vertical or inclined.

It will be seen that by these means wherever the image of the target is situated in the field of view it will always be very near to some reference mark or some part of a line with which the comparison of apparent distance may be carried out.

Figure 5:
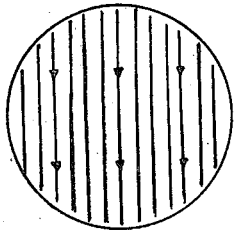
Figure 6:
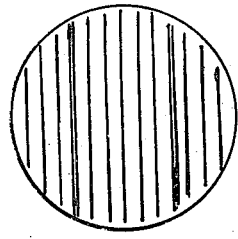
Figure 7:
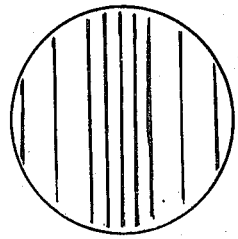
Figure 9:
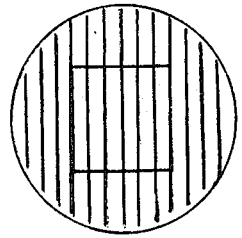

In order to prevent false stereoscopic observations being made, we may provide certain corresponding marks in the two fields, distinguishable from the others, as for example, in the manner indicated in Figs. 5, 6 and 9. The same result will be attained if the marks, while corresponding in the two fields, are not at equal distances apart, for example, as indicated in Figure 7, so that no mistake will arise by bringing marks which are not intended to correspond to each other into stereoscopic contact in the two ocular fields.

Instruments constructed in accordance with this invention have a great advantage over other forms of stereoscopic rangefinders for observation on targets that are rapidly moving; for example, the new system is specially advantageous for rangefinding upon aeroplanes, airships, etc., etc. Some examples of the modes in which our invention may be carried into effect are given in the accompanying diagrams.

It is not possible, by means of drawings alone, to exhibit stereoscopic effects. The diagrams must therefore be considered to represent the field of view as seen by one eye or the two fields when seen in proper correspondence by the two eyes.

Figure 1:
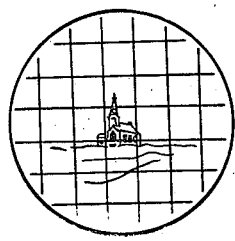

In Figure 1 the reference marks take the form of a grating by providing in the focal plane of each field of view a grating, the two gratings corresponding in all respects, and the target will appear to lie before or behind the grating until the operating mechanism of the instrument so alters the apparent distance either of the reference mark or of the target as to cause them to appear in one plane.

Figure 2:
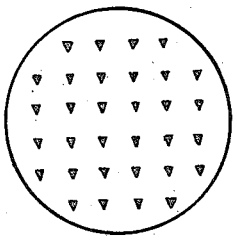

In Figure 2 the isolated marks are distributed over the field in any convenient arrangement, it being understood that all the marks are to appear to the eyes of the observer to be situated at the same distance.

Figure 3:
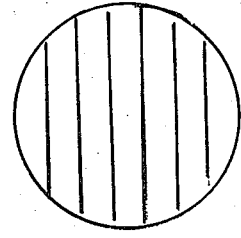

In Figure 3 the marks appear as vertical lines stretched across the field.

Figure 4:
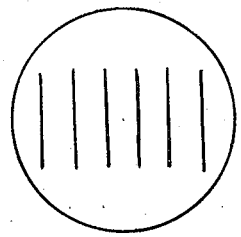

In Figure 4 the lines do not extend for the whole height of the field.

In any such arrangement as that shown in Figure 5, the lines in the two fields may be as close as we please, some corresponding lines being made distinguishable from the others by suitable marks so that lines that are not intended to correspond will not be combined stereoscopically.

In Figure 6 lines are differentiated by some being doubled or made thicker than the others.

In Figure 7 the lines are not at a uniform distance apart and thus they may be made as close together as we please without confusion between lines that are not intended to correspond.

Figure 8:
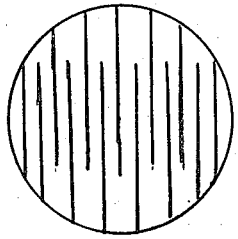

In Figure 8 the lines are distinguished by being of different length.

In Figure 9 another arrangement for identifying corresponding lines is shown.

An indefinite variety of modifications is possible; those given are merely by way of illustration. In all cases the essential feature is retained, viz, that marks—all of which appear stereoscopically to the eyes of the observer to be at the same distance—are provided distributed over the field or a considerable part thereof so that accurate observation of a target may be made in any part of an extensive field and the target need not be brought into any one part of the field for accurate rangefinding.

Figure 10 shows in plan diagrammatically one known arrangement for bringing the images of a target into the same apparent perspective depth as the marks or lines by a shift of the position of one of the images of the target. The method illustrated is accomplished in the known manner by translating a small angle refracting prism along the path of one of the beams of light, in that of the right hand telescope. In Fig. 10, G and G¹ designate two grids, such as referred to, one in the focal plane of each eyepiece.

We claim:—

1. In a rangefinder working on the stereoscopic principle the provision in the focal plane of each field of view of a series of marks or lines distributed over each of the two fields of view all of which marks or lines appear to be situated at the same distance (perspective depth) from the observer when viewed stereoscopically, for the purposes set forth.

2. In a rangefinder working on the stereoscopic principle, the provision in each field of view of a series of marks or lines distributed over the field which marks or lines appear to be situated at the same distance (perspective depth) when viewed stereoscopically and means for bringing the marks or lines and the images of the target into the same apparent perspective depth when viewed stereoscopically, for the purposes set forth.

ARCHIBALD BARR.
WILLIAM STROUD.